(No Model.)

G. SHEPARD.
FOOT VALVE.

No. 257,088. Patented Apr. 25, 1882.

Witnesses:
H. C. McNair
Geo. W. Watson

Inventor:
George Shepard

UNITED STATES PATENT OFFICE.

GEORGE SHEPARD, OF ST. LOUIS, MISSOURI, ASSIGNOR OF ONE-HALF TO THOMAS H. BRADLEY, OF WASHINGTON, DISTRICT OF COLUMBIA.

FOOT-VALVE.

SPECIFICATION forming part of Letters Patent No. 257,088, dated April 25, 1882.

Application filed January 14, 1882. (No model.)

*To all whom it may concern:*

Be it known that I, GEORGE SHEPARD, a citizen of the United States, residing at St. Louis, in the State of Missouri, have invented new and useful Improvements in Valves, of which the following is a specification.

My invention relates to improvements in valves in which a disk with projections made of metal all in one piece forms a valve which operates with certainty and checks itself when the projections thereto touch the ordinary attachments to a valve-chamber; and the objects of my improvements are, first, to provide a durable sliding valve which is free to turn parallel to its seat when in the cylinder-chamber; second, to compel the valve-disk in a cylinder-valve chamber to work in a direct line from its seat to its check when the pump is operated; and, third, to make a valve with projections which will check the valve when they find a bushing or a pipe opposite its seat, and will admit around the valve, when at that check, a free flow of fluid while suction is applied above. I attain these objects by the mechanism illustrated in the accompanying drawings, in which—

Figure 1:
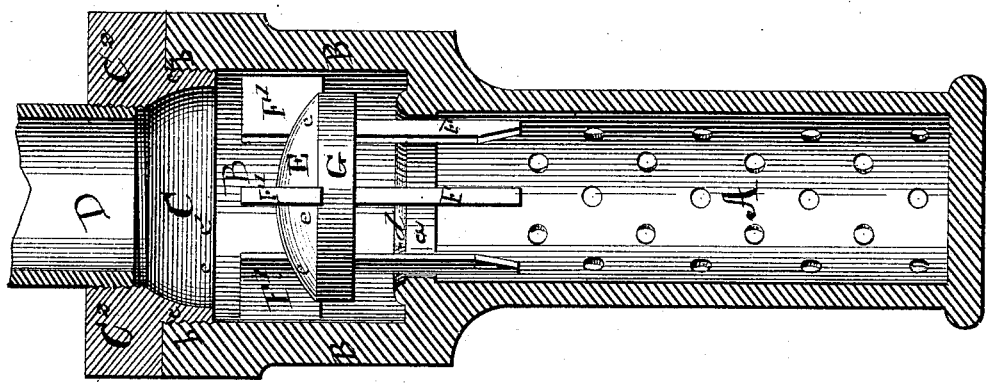
Figure 2:
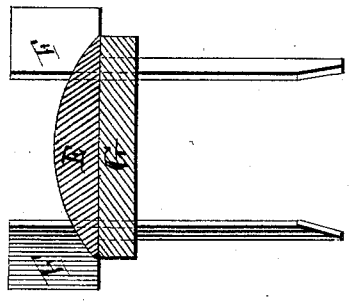
Figure 3:
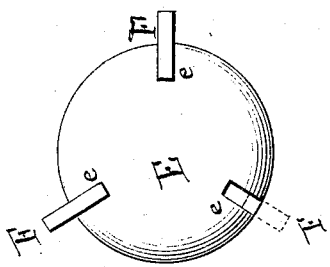

Figure 1 is a vertical sectional view of the valve as it appears in its chamber. Fig. 2 is a perspective view of the valve as it appears out of the chamber. Fig. 3 is a top view of the valve as it appears out of the chamber.

Similar letters refer to similar parts throughout the several views.

A represents the strainer. $a$ is the rim which lessens the friction on the lower guides. B is the cylinder of the valve-chamber. $b$ is the thread cut at the cylinder part where the bushing or a pipe is to be inserted. C is a bushing or a pipe. $c$ is a thread cut in the bushing or pipe end which is to be inserted in the thread $b$ cut in the cylinder. $c'$ is the end of the bushing or pipe, against which end the guide-points F′ F′ F′ are made to strike and check the valve. $c^2$ is the thread cut to receive a smaller pipe in the bushing or pipe C for an extension of conduit. D is an extension-pipe screwed into $c^2$ of the bushing or pipe C. $d$ is the valve-seat. E is the valve-disk. F F F are projections or guides which control and check the valve-disk, with which they are cast in one piece. G is a leather or rubber cushion for the valve.

The pipe D, or one in lieu thereof, inserted as at C, is attached to the barrel of a pump below the suction-valve. When the piston is drawn up the pump-barrel the vacuum created thereby causes the valve E to rise from its seat until one or more of the projections F′ F′ F′ come in contact with the bushing or pipe end $c'$, whereupon the valve is checked and the suction draws the fluid upward around the disk or between the projections, while the vacuum continues. When the piston descends the valve E returns to its seat $d$, being guided thereto by the lower projections, F F F, which slide against the rim $a$, and the fluid previously drawn around the valve into the pipe or conduit above the valve stands subject to the expelling process of the pump's operations above, but cannot repass the seated valve.

What I claim as my invention, and desire to secure by Letters Patent, is—

1. A valve consisting of the disk E and the projections F F′, which projections permit the valve to turn parallel to its seat and compel the disk to operate in a direct line between its seat and its check.

2. A valve provided with projections F′, in combination with the pipe or bushing C and cylinder B, the contact of said projections with the bushing or pipe providing a check, substantially as described.

3. The valve-cylinder provided with the rim $a$, as and for the purpose described.

4. The cylinder B, having a valve-seat, $d$, and rim $a$, in combination with the pipe or bushing C and valve E, having upper and lower projections, substantially as set forth.

GEORGE SHEPARD.

Witnesses:
H. C. MCNAIR,
GEO. W. WATSON.